(12) United States Patent
Elgat

(10) Patent No.: US 10,710,903 B2
(45) Date of Patent: Jul. 14, 2020

(54) PROCESSING CONTAMINATED WATER CONTAINING VOLATILE COMPOUNDS VIA FLASH EVAPORATION

(71) Applicant: Elcon Recycling Center (2003) Ltd., Neot Hovev (IL)

(72) Inventor: Zvi Elgat, Maccabim-Reut (IL)

(73) Assignee: Elcon Recycling Center (2003) Ltd., Neot Hovev (IL)

( * ) Notice: Subject to any disclaimer, the term of this patent is extended or adjusted under 35 U.S.C. 154(b) by 285 days.

(21) Appl. No.: 15/542,676

(22) PCT Filed: Jan. 11, 2016

(86) PCT No.: PCT/IL2016/050029
§ 371 (c)(1),
(2) Date: Jul. 11, 2017

(87) PCT Pub. No.: WO2016/110860
PCT Pub. Date: Jul. 14, 2016

(65) Prior Publication Data
US 2017/0369331 A1    Dec. 28, 2017

Related U.S. Application Data

(60) Provisional application No. 62/102,052, filed on Jan. 11, 2015.

(51) Int. Cl.
*B01D 1/00*    (2006.01)
*B01D 1/14*    (2006.01)
(Continued)

(52) U.S. Cl.
CPC .............. *C02F 1/06* (2013.01); *B01D 1/0082* (2013.01); *B01D 1/14* (2013.01); *C02F 1/025* (2013.01);
(Continued)

(58) Field of Classification Search
CPC ......... B01D 1/0082; B01D 1/14; C02F 1/025; C02F 1/048; C02F 1/06; C02F 1/16;
(Continued)

(56) References Cited

U.S. PATENT DOCUMENTS 3,966,633 A    6/1976  Friedman
6,444,130 B1 *    9/2002  Manganaro ............. C02F 11/08
            210/750
(Continued)

FOREIGN PATENT DOCUMENTS

EP    0354656    2/1990
EP    2755729    7/2014
(Continued)

OTHER PUBLICATIONS

International Preliminary Report II on Patentability dated Aug. 3, 2017 From International Preliminary Examining Authority Re. Application No. PCT/IL2016/050029. (19 Pages).
(Continued)

*Primary Examiner* — Lucas A Stelling

(57) ABSTRACT

Processing contaminated water containing volatile or/and semi-volatile compounds via flash evaporation. Method and system include: superheating contaminated water (via a superheating unit), for forming superheated contaminated water having a temperature equal to or higher than a predetermined threshold temperature; flash evaporating the superheated contaminated water (via a flash evaporation unit), for forming superheated contaminated steam; and thermally oxidizing the superheated contaminated steam (via a thermal oxidation unit), so as to thermally oxidize the volatile compounds contained therein, and form thermal oxidation gas/vapor products. Optionally, further includes integrated configuration and operation of a process control/data-information processing unit, and a heat recycling unit. Results in obtaining high yields and high energy efficiencies (Continued)

for removal of volatile compounds from contaminated water. Particularly applicable for processing water contaminated with volatile organic compounds (VOCs) or/and semi-volatile organic compounds (SVOCs), and volatile or/and semi-volatile inorganic compounds.

9 Claims, 3 Drawing Sheets

(51) Int. Cl.
| | |
|---|---|
| C02F 1/02 | (2006.01) |
| C02F 1/04 | (2006.01) |
| C02F 1/06 | (2006.01) |
| C02F 1/16 | (2006.01) |
| C02F 1/72 | (2006.01) |
| F01K 5/00 | (2006.01) |
| F22G 1/14 | (2006.01) |
| F22G 5/16 | (2006.01) |
| F22G 5/20 | (2006.01) |
| C02F 101/32 | (2006.01) |

(52) U.S. Cl.
CPC ............... *C02F 1/048* (2013.01); *C02F 1/16* (2013.01); *C02F 1/72* (2013.01); *F01K 5/00* (2013.01); *F22G 1/14* (2013.01); *F22G 5/16* (2013.01); *F22G 5/20* (2013.01); *C02F 2101/322* (2013.01); *C02F 2209/02* (2013.01)

(58) Field of Classification Search
CPC ...... C02F 1/72; C02F 11/08; C02F 2101/322; C02F 2209/02; F01K 5/00; F22G 1/14; F22G 5/16; F22G 5/20
See application file for complete search history.

(56) References Cited

U.S. PATENT DOCUMENTS

| | | |
|---|---|---|
| 7,455,781 B2 | 11/2008 | Levin |
| 7,722,775 B2 | 5/2010 | Levin |
| 8,282,837 B2 | 10/2012 | Levin |
| 8,496,787 B2 | 7/2013 | Lord |
| 2008/0296215 A1* | 12/2008 | Simon .................. C02F 9/00 210/202 |
| 2010/0282592 A1* | 11/2010 | Elgat .................. B01D 3/04 203/11 |
| 2011/0220588 A1 | 9/2011 | Elgat |
| 2012/0090979 A1* | 4/2012 | Elgat .................. B01J 19/002 203/3 |

FOREIGN PATENT DOCUMENTS

| | | |
|---|---|---|
| RU | 903305 | 2/1982 |
| WO | WO 2007/131235 | 11/2007 |
| WO | WO 2008/026196 | 3/2008 |
| WO | WO 2016/110860 | 7/2016 |

OTHER PUBLICATIONS

International Preliminary Report on Patentability dated Jan. 31, 2017 From International Preliminary Examining Authority Re. Application No. PCT/IL2016/050029. (11 Pages).
International Search Report and the Written Opinion dated Jun. 16, 2016 From International Searching Authority Re. Application No. PCT/IL2016/050029.
Gough "Advanced Control of Steam Superheat Temperature on A Utility Boiler", IEEE ISA EXPO/2000 Technology Updates, P86b-000316-1-P86b-000316-5, 2000. p. 2-4.
Supplementary European Search Report and the European Search Opinion dated May 29, 2018 From the European Patent Office Re. Application No. 16734974.5. (8 Pages).
Request for Examination and Search Report dated Apr. 11, 2019 From the Federal Service for Intellectual Property, ROSPATENT, Federal State Budgetary Institution, Federal Institute of Industrial Property of the Russian Federation Re. Application No. 2017127687 and Its Translation Into English. (11 Pages).
Decision to Grant A Patent dated Jul. 18, 2019 From the Federal Service for Intellectual Property, ROSPATENT, Federal State Budgetary Institution, Federal Institute of Industrial Property of the Russian Federation Re. Application No. 2017127687 and Its Translation Into English. (18 Pages).
Examination Report Under Sections 12 & 13 of the Patents Act, 1970 and the Patents Rules, 2003 dated Sep. 23, 2019 From the Government of India, Intellectual Property India, Patents, Designs, Trade Marks, Geographical Indications Re. Application No. 201727027660. (6 Pages).

* cited by examiner

Superheating the contaminated water, for forming superheated contaminated water having a temperature equal to or higher than a predetermined threshold temperature.

108

Flash evaporating the superheated contaminated water, for forming superheated contaminated steam.

112

Thermally oxidizing the superheated contaminated steam, so as to thermally oxidize the volatile compounds contained therein, and form thermal oxidation gas/vapor products.

Superheating the contaminated water, for forming superheated contaminated water having a temperature equal to or higher than a predetermined threshold temperature.  —— 118a

108

Flash evaporating the superheated contaminated water, for forming superheated contaminated steam.  —— 118b

112

Thermally oxidizing the superheated contaminated steam, so as to thermally oxidize the volatile compounds contained therein, and form thermal oxidation gas/vapor products.  —— 118c

120

Recycling heat from the thermal oxidation gas/vapor products to the superheating, thereby providing heat for performing the superheating.  —— 118d

116

Controlling operation of, and processing data-information associated with, the superheating, flash evaporating, thermally oxidizing, and recycling heat.  —— 118

PROCESSING CONTAMINATED WATER CONTAINING VOLATILE COMPOUNDS VIA FLASH EVAPORATION

RELATED APPLICATIONS

This application is a National Phase of PCT Patent Application No. PCT/IL2016/050029 having International filing date of Jan. 11, 2016, which claims the benefit of priority under 35 USC § 119(e) of U.S. Provisional Patent Application No. 62/102,052, filed on Jan. 11, 2015. The contents of the above applications are all incorporated by reference as if fully set forth herein in their entirety.

FIELD OF THE INVENTION

The present invention, in some embodiments thereof, relates to the fields of water treatment and water purification, particularly involving removal (e.g., via conversion to non-hazardous compounds) of volatile compounds from contaminated water, such as industrial wastewater. More particularly, but not exclusively, the present invention relates to processing contaminated water containing volatile compounds via techniques involving flash evaporation, among other processes, such as superheating and thermal oxidation processes. Particularly applicable for processing water contaminated with volatile organic compounds (VOCs) or/and semi-volatile organic compounds (SVOCs), as well as volatile and/or semi-volatile inorganic compounds.

BACKGROUND OF THE INVENTION

Sources of contaminated water, such as industrial wastewater, typically contain contaminants which are hazardous or potentially hazardous to the environment, as well as to the health of (human, animal, agricultural) living entities. Such contaminants may be in the form of volatile or/and semi-volatile compounds, for example, volatile organic compounds (VOCs) or/and semi-volatile organic compounds (SVOCs), as well as volatile or/and semi-volatile inorganic compounds.

In accordance with well established and implemented environmental regulations, industrial wastewater must be processed (via water treatment or purification techniques) so as to remove, or at least substantially decrease amounts of, hazardous contaminants contained therein, thereby, eliminating or at least mitigating hazards associated with the wastewater.

Removing volatile compounds from contaminated water sources, such as industrial wastewater or other contaminated aqueous streams, is widely and commonly done by using steam stripping processes and techniques. In steam stripping, externally generated steam, functioning as a stripping gas, and contaminated water are counter-currently fed into bottom and top portions, respectively, of a stripping column. The contaminated water is directly contacted (via interaction with large surface area provided by packing material supported upon trays) by the steam which volatizes and removes (strips away) volatile compounds from the contaminated water into a vapor phase. The resulting vapor phase of steam and volatile compounds exits the stripping column as exhaust and is further processed, for example, via condensation to provide a water phase and a volatile compound phase. The volatile compound phase is typically separated from the water phase and further processed, for example, via incineration (such as thermal oxidation) or recovered for other use. The resulting (mostly, but not entirely) stripped contaminated water, via batch mode steam stripping, is typically recycled and combined with additional contaminated water for further stripping cycles, or, via continuous mode steam stripping, is removed for further processing, ultimately leading to producing cleaner or purer, and environmentally friendly, forms of water.

The same applicant/assignee of the present disclosure developed water treatment and purification techniques involving various combinations of steam stripping and regenerative thermal oxidation (RTO) processes (e.g., direct thermal, flare, or thermo-catalytic, RTO processes). According to such techniques, following steam stripping contaminated water, the volatile compound phase (vapor phase of steam and volatile compounds) exiting the stripping column as exhaust is subjected to an RTO process, resulting in further removing volatile compounds originally present in the initial contaminated water. Exemplary teachings and practices of such water treatment and purification techniques are described in: PCT International Patent Application Publication No. WO 2008/026196; and U.S. Pat. Nos. 8,282,837; 7,722,775; and 7,455,781, all commonly assigned with the present application, the entire contents of which are incorporated in this application as if fully set forth.

According to an aspect of some embodiments of the present invention there is provided a method for processing contaminated water containing volatile or/and semi-volatile compounds, the method comprising: superheating the contaminated water, for forming superheated contaminated water having a temperature equal to or higher than a predetermined threshold temperature; flash evaporating the superheated contaminated water, for forming superheated contaminated steam; and thermally oxidizing the superheated contaminated steam, so as to thermally oxidize the volatile or/and semi-volatile compounds contained therein, and form thermal oxidation gas/vapor products.

According to some embodiments of the invention, the superheating, the predetermined threshold temperature is equal to or higher than a temperature selected from the group consisting of 103° C., 104° C., 105° C., and 110° C.

According to some embodiments of the invention, the superheating, the predetermined threshold temperature is maintained with a predetermined temperature range of about ten degrees, or of about two degrees.

According to some embodiments of the invention, the superheating is performed so that the superheated contaminated water remains at the predetermined threshold temperature when initiating the flash evaporating process.

According to some embodiments of the invention, the method further comprises controlling integrated operation of, and processing data-information associated with, the superheating, the flash evaporating, and the thermally oxidizing, via a process control/data-information processing unit.

According to some embodiments of the invention, the flash evaporating includes controlling the temperature and rate of evaporation of the superheated contaminated water, so as to control amount and concentration of the superheated contaminated water, and of the superheated contaminated steam subjected to the thermally oxidizing process, via a process control/data-information processing unit.

According to some embodiments of the invention, the method further comprises recycling heat from the thermal oxidation gas/vapor products to the superheating, thereby providing heat for performing the superheating.

According to some embodiments of the invention, the method further comprises controlling integrated operation of, and processing data-information associated with, the superheating, the flash evaporating, the thermally oxidizing, and the recycling heat.

According to some embodiments of the invention, the superheating is spatially and temporally directly, and sequentially immediately, operatively connected to, and followed by, the flash evaporating.

According to some embodiments of the invention, the flash evaporating is spatially and temporally directly, and sequentially immediately, operatively connected to, and followed by, the thermally oxidizing.

According to some embodiments of the invention, the method further comprises recycling heat from the thermal oxidation gas/vapor products to the superheating, wherein the recycling heat is spatially and temporally directly, and sequentially immediately, operatively connected to, and followed by, the superheating.

According to an aspect of some embodiments of the present invention there is provided a system for processing contaminated water containing volatile or/and semi-volatile compounds, the system comprising: a superheating unit that superheats the contaminated water forms superheated contaminated water having a temperature equal to or higher than a predetermined threshold temperature; a flash evaporation unit, operatively connected to the superheating unit, that flash evaporates the superheated contaminated water and forms superheated contaminated steam; and a thermal oxidation unit, operatively connected to the flash evaporation unit, that thermally oxidizes the superheated contaminated steam, so as to thermally oxidize the volatile or/and semi-volatile compounds contained therein, and form thermal oxidation gas/vapor products.

According to some embodiments of the invention, the superheating unit is spatially and temporally directly, and sequentially immediately, operatively connected to, and followed by, the flash evaporation unit.

According to some embodiments of the invention, the flash evaporation unit is spatially and temporally directly, and sequentially immediately, operatively connected to, and followed by, the thermal oxidation unit.

According to some embodiments of the invention, the system further comprises a heat recycling unit operatively connected to the thermal oxidation unit and the superheating unit, that recycles heat from the thermal oxidation gas/vapor products to the superheating unit, wherein the heat recycling unit is spatially and temporally directly, and sequentially immediately, operatively connected to, and followed by, the superheating unit.

According to some embodiments of the invention, the superheating unit maintains the predetermined threshold temperature equal to or higher than a temperature selected from the group consisting of 103° C., 104° C., 105° C., and 110° C.

According to some embodiments of the invention, the system further comprises a process control/data-information processing unit, operatively connected to, and controlling integrated operation of and processing data-information associated with, the superheating unit, the flash evaporation unit, and the thermal oxidation unit.

According to some embodiments of the invention, the superheating unit is controlled by the process control/data-information processing unit, so that the superheating unit maintains the predetermined threshold temperature of the superheated contaminated water when the superheated contaminated water enters the flash evaporation unit.

According to some embodiments of the invention, the flash evaporation unit is controlled by the process control/data-information processing unit, by controlling the temperature and rate of evaporation of the superheated contaminated water inside the flash evaporation unit, so as to control amount and concentration of the superheated contaminated water, and of the superheated contaminated steam entering the thermal oxidation unit.

According to some embodiments of the invention, the system further comprises a heat recycling unit, operatively connected to the thermal oxidation unit and the superheating unit, that recycles heat from the thermal oxidation gas/vapor products to the superheating unit.

According to some embodiments of the invention, the system further comprises a process control/data-information processing unit, operatively connected to, and, controlling integrated operation of and processing data-information associated with, the superheating unit, the flash evaporation unit, the thermal oxidation unit, and the heat recycling unit.

All technical or/and scientific words, terms, or/and phrases, used herein have the same or similar meaning as commonly understood by one of ordinary skill in the art to which the invention pertains, unless otherwise specifically defined or stated herein. Methods, materials, and examples described herein are illustrative only and are not intended to be necessarily limiting. Although methods or/and materials equivalent or similar to those described herein can be used in practicing or/and testing embodiments of the invention, exemplary methods or/and materials are described below. In case of conflict, the patent specification, including definitions, will control.

Implementation of some embodiments of the invention can involve performing or completing selected tasks manually, automatically, or a combination thereof. Moreover, according to actual instrumentation and equipment of some embodiments of the invention, several selected tasks could be implemented by hardware, by software, by firmware, or a combination thereof, using an operating system.

For example, hardware for performing selected tasks according to embodiments of the invention could be implemented as a chip, as a circuit, or a combination thereof. As software, selected tasks of some embodiments of the invention could be implemented as a plurality of software instructions being executed by a computer using any suitable operating system. In an exemplary embodiment of the invention, one or more tasks of exemplary embodiments of the method and/or system as described herein are performed by a data processor, such as a computing platform for executing a plurality of instructions. Optionally, the data processor includes a volatile memory for storing instructions or/and data. Alternatively or additionally, optionally, the data processor includes a non-volatile storage, for example, a magnetic hard-disk or/and removable media, for storing instructions or/and data. Optionally, a network connection is provided as well. Optionally, a display or/and a user input device such as a keyboard or mouse is provided as well.

BRIEF DESCRIPTION OF THE SEVERAL VIEWS OF THE DRAWINGS

Some embodiments of the present invention are herein described, by way of example only, with reference to the accompanying drawings. With specific reference now to the drawings in detail, it is stressed that the particulars shown are by way of example and for purposes of illustrative description of some embodiments of the present invention. In this regard, the description taken together with the accompanying drawings make apparent to those skilled in the art how some embodiments of the present invention may be practiced.

In the drawings:

FIG. 1 is a flow diagram of an exemplary embodiment of the method for processing contaminated water containing volatile compounds via flash evaporation, in accordance with some embodiments of the invention;

FIG. 2 is a flow diagram of another exemplary embodiment of the method for processing contaminated water containing volatile compounds via flash evaporation, particularly highlighting optional controlled integration thereof, and optional, additional inclusion of a heat recycling process, in accordance with some embodiments of the invention.

DESCRIPTION OF SPECIFIC EMBODIMENTS OF THE INVENTION

Figure 3:
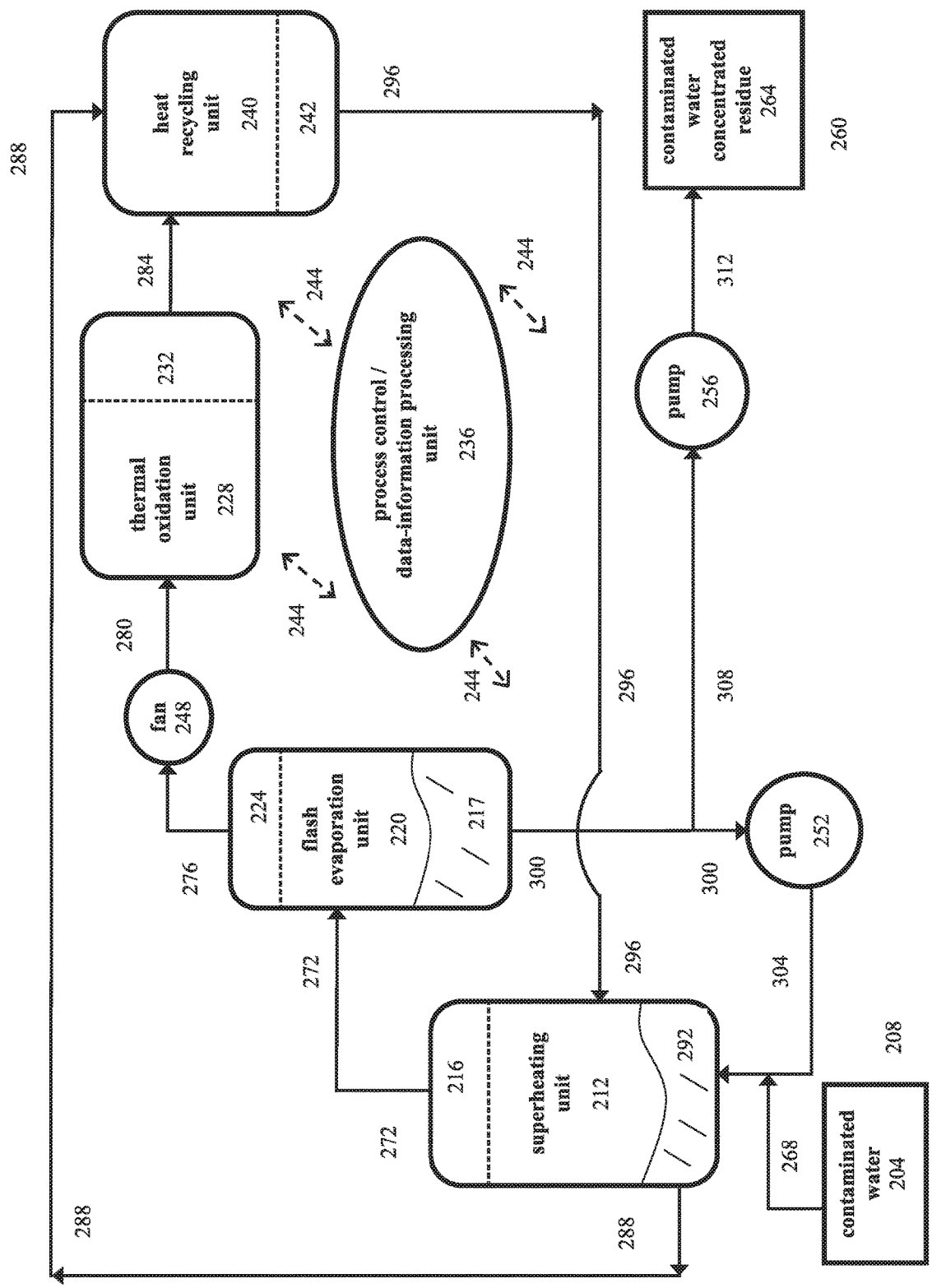
FIG. 3 is a schematic block diagram of an exemplary embodiment of the system for processing contaminated water containing volatile compounds via flash evaporation, in accordance with some embodiments of the invention.

Overview:

The present invention, in some embodiments thereof, relates to water treatment and water purification techniques, particularly involving removal (e.g., via conversion to non-hazardous compounds) of volatile compounds from contaminated water, such as industrial wastewater. More particularly, but not exclusively, the present invention relates to processing contaminated water containing volatile compounds via flash evaporation. In some embodiments, the present invention relates to processing contaminated water via techniques (methodologies, apparatuses) involving superheating, flash evaporation, and thermal oxidation processes. Some embodiments include optional addition of controlled integration thereof, and optional addition of a heat recycling process. Particularly applicable for processing water contaminated with volatile organic compounds (VOCs) or/and semi-volatile organic compounds (SVOCs), as well as volatile or/and semi-volatile inorganic compounds.

Implementation of some embodiments of the invention results in obtaining high yields and high energy efficiencies for removal of the volatile compounds from the contaminated water. In exemplary embodiments, essentially all of the volatile compounds are thermally oxidized and converted to non-hazardous gas (e.g., carbon dioxide), resulting in obtaining high yields for removal of the volatile compounds from the contaminated water (e.g., in terms of amount of volatile compounds removed vs. initial amount of volatile compounds processed during the overall technique). In optional exemplary embodiments, there is further including recycling heat (contained in hot water vapor and gases) generated during the thermal oxidation process to the superheating process, thereby, providing heat for performing the superheating, resulting in obtaining high energy efficiencies for removal of the volatile compounds from the contaminated water (e.g., in terms of amount of energy generated vs. amount of energy required and consumed during the overall technique).

Removing volatile compounds from contaminated water sources, such as industrial wastewater or other contaminated aqueous streams, is widely and commonly done by using steam stripping processes and techniques. However, steam stripping has limitations. For improving yields, energy efficiencies, and cost effectiveness of removing volatile compounds from contaminated water (e.g., industrial wastewater) based on a steam stripping process, the same applicant/assignee of the present disclosure developed water treatment and purification techniques involving various combinations of steam stripping and regenerative thermal oxidation (RTO) processes (e.g., direct thermal, flare, or thermo-catalytic, RTO processes).

In view of some on-going limitations existing in the fields of water treatment and water purification, the inventor set out to further improve yields (to better meet regulatory requirements), energy efficiencies, and cost effectiveness of removing volatile compounds from contaminated water (e.g., industrial wastewater), without requiring a steam or/and air stripping process, and without requiring further processing (for example, via biological polishing) of initially processed contaminated water.

As disclosed herein, the inventor developed techniques (methods, systems) for removing volatile compounds, such as volatile organic compounds (VOCs) or/and semi-volatile organic compounds (SVOCs), as well as volatile or/and semi-volatile inorganic compounds, from contaminated water, via flash evaporation.

Obtaining high yields and high energy efficiencies for removal of the volatile compounds from the contaminated water may be achieved by performing the various processes, namely, superheating, flash evaporation, and thermal oxidation, in an optional, highly controlled, integrated manner. In particular, in some embodiments, results obtained from the thermal oxidation process are highly dependent upon operation (operating parameters and conditions) of, and results obtained from, the flash evaporation process, which, in turn, are highly dependent upon operation (operating parameters and conditions) of, and results obtained from, the superheating process. In particular, in some embodiments, results obtained from the superheating process are highly dependent upon operation (operating parameters and conditions) of, and results obtained from, an optional, additional heat recycling process.

Controlled integration of the various chemical engineering unit operations/processes for processing the contaminated water may involve one or more of the following exemplary process control/operational characteristics and features, based on integrated configuration and operation of a process control/data-information processing unit.

For example, in some embodiments, there is controlling the process of superheating the contaminated water via integrated configuration and operation of a superheating unit and the process control/data-information processing unit. This may involve, for example, controlling the temperature (and range thereof), at which the contaminated water is superheated, so as to assure forming superheated contaminated water having an output temperature equal to or higher than a predetermined threshold temperature, and to assure the superheated contaminated water remains at such temperature (or within a predetermined temperature range) upon entering, and initiation of, the next process of flash evaporation. For example, in some embodiments, the predetermined threshold temperature is a temperature higher than the boiling point (100° C.) of water at atmospheric pressure, for example, 103° C., or 104° C., or 105° C., or higher, such as 110° C. In exemplary embodiments, the predetermined threshold temperature is a temperature in a range of between about 103° C. and about 120° C.

In exemplary embodiments, superheating the contaminated water is performed for forming superheated contaminated water having a temperature equal to or higher than the predetermined threshold temperature, whereby during the superheating process, the temperature is controllably allowed to vary within a predetermined temperature range. In exemplary embodiments, the predetermined temperature range is a relatively narrow temperature range, for example, of less than about ten degrees, and may even be as narrow as about two degrees.

For example, in some embodiments, there is controlling the process of flash evaporation via integrated configuration and operation of a flash evaporation unit and the process control/data-information processing unit. This may involve, for example, controlling temperature and the rate of evaporation of the superheated contaminated water, so as to control amount (mass) and concentration of the superheated contaminated water, and of the resulting flash evaporated superheated contaminated water in the form of superheated contaminated steam (vapor phase of steam and volatile or/and semi-volatile compounds), which, in turn, is subjected to the next process of thermal oxidation.

For example, in some embodiments, there is controlling the process of thermal oxidation via integrated configuration and operation of a thermal oxidation unit and the process control/data-information processing unit. This may involve, for example, controlling the rate of thermally oxidizing the superheated contaminated steam, so as to control thermal oxidation of the volatile or/and semi-volatile compounds contained therein, thereby, controlling the resultant formation of thermal oxidation product gases and vapors.

In exemplary embodiments which include recycling heat (contained in hot water vapor and gases) generated during the thermal oxidation process to the superheating process, there is controlling the process of recycling heat via integrated configuration and operation of a heat recycling unit and the process control/data-information processing unit. This may involve, for example, controlling the quantity (e.g., volume throughput, temperature) and rate (e.g., flow) of heat which is recycled from the thermal oxidation gas/vapor products to the superheating process. This, in turn, enables further controlling the superheating process, for example, by providing heat for superheating the contaminated water at a temperature equal to or higher than the predetermined threshold temperature.

The above exemplary process control/operational characteristics and features of controlled process integration involve appropriate (spatially and temporally) integrated operative connections, configurations, and operations of the superheating unit, the flash evaporation unit, the thermal oxidation unit, and the heat recycling unit, with the process control/data-information processing unit, along with other components, including, for example, a contaminated water input or feed assembly, a fan, pumps, and a contaminated water concentrate collection reservoir.

Controlled integration of the various chemical engineering unit operations/processes for processing the contaminated water may be carried out and effected according to a specific spatial manner or mode, in particular, as relating to physical (spatial) configurational layout and positioning in space domain of the different processes relative to each other.

Controlled integration of the various chemical engineering unit operations/processes for processing the contaminated water may also be carried out and effected according to a specific temporal manner or mode, in particular, as relating to timing (temporal) factors and scheduling in time domain of the different processes relative to each other. For example, in some embodiments, exemplary specific temporal manners or modes of operation may be based on a special synchronous (synchronized) type of operation, involving pre-determined synchronous (synchronized) operation of two or more of the different processes relative to each other in the time domain. Such specially synchronous (synchronized) type of operation may involve pre-determined synchronous (synchronized) operation of two or more of the different processes relative to each other in the time domain, for example, according to a serial (sequential) manner or mode of operation, or, alternatively, according to a parallel (non-sequential) manner or mode of operation. For example, in some embodiments, exemplary specific temporal manners or modes of operation may be based on a simultaneous (at-the-same-time) type of operation, involving pre-determined simultaneous operation of two or more of the different processes relative to each other in the time domain.

For example, in some embodiments, the superheating process, and associated superheating unit, are configured to be spatially (physically) and temporally, 'directly' or 'sequentially, immediately', operatively connected to, and followed by, the flash evaporation process, and associated flash evaporation unit, respectively. For example, in some embodiments, the flash evaporation process, and associated flash evaporation unit, are configured to be spatially (physically) and temporally, 'directly' or 'sequentially, immediately', operatively connected to, and followed by, the thermal oxidation process, and associated thermal oxidation unit, respectively. For example, in some embodiments, the thermal oxidation process, and associated thermal oxidation unit, are configured to be spatially (physically) and temporally, 'directly' or 'sequentially, immediately', operatively connected to, and followed by, the heat recycling process, and associated heat recycling unit, respectively.

Additionally, for example, in some embodiments, the heat recycling process, and associated heat recycling unit, are configured to be spatially (physically) and temporally, 'directly' or 'sequentially, immediately', operatively connected to, and followed by, the superheating process, and associated superheating unit, respectively.

By implementing and practicing some embodiments of the herein disclosed invention, in laboratory scale, pilot scale, and plant full scale, environments, the inventor obtained significantly improved results of removing volatile compounds from contaminated water compared to results obtained using existing techniques for processing contaminated water containing volatile compounds. Such improved results include better yields, energy efficiencies, and cost effectiveness of removing volatile compounds, such as volatile organic compounds (VOCs) or/and semi-volatile organic compounds (SVOCs), as well as volatile or/and semi-volatile inorganic compounds, from contaminated water (e.g., industrial wastewater). Improved results were obtained without requiring a steam or/and air stripping process, and without requiring further processing (for example, via biological polishing) of initially processed contaminated water.

Exemplary results include yields of higher than 99% removal of volatile organic compounds (VOCs), and higher than 90% removal of semi-volatile organic compounds (SVOCs), from contaminated water.

Steps or procedures, sub-steps or sub-procedures, and, equipment and materials, system units, system sub-units, devices, assemblies, sub-assemblies, mechanisms, structures, components, elements, and configurations, and, peripheral equipment, utilities, accessories, and materials, as well as operation and implementation, of exemplary embodiments, alternative embodiments, specific configurations, and, additional and optional aspects, characteristics, or features, thereof, of some embodiments of the present invention, are better understood with reference to the following illustrative description and accompanying drawings. Throughout the following illustrative description and accompanying drawings, same reference notation and terminology (i.e., numbers, letters, symbols) are consistently used and refer to same steps or procedures, structures, components, elements, or/and features. It is to be understood that the invention is not necessarily limited in its application to any particular sequential ordering of method steps or procedures, or to particular details of construction or/and arrangement of device, apparatus, or/and system components, set forth in the following illustrative description. The invention is capable of other embodiments or of being practiced or carried out in various ways.

An aspect of some embodiments of the present invention is a method for processing contaminated water containing volatile or/and semi-volatile compounds.

Definitions

The terms defined below are used in a not necessarily limiting and exemplary manner for the purpose of convenient description:

The term 'volatile' refers to a substance (e.g., compound) which readily evaporates at given conditions of temperature and pressure (for example, relative to room temperature of 25° C. and atmospheric pressure). A volatile substance (compound), at a given temperature and pressure, is capable of readily being vaporized (vaporizing) or evaporated (evaporating) from a solid or liquid form to a vapor form. For example, at conditions including room temperature and atmospheric pressure, a volatile substance (compound) typically has a relatively high vapor pressure and a relatively low boiling point.

The term 'semi-volatile' refers to a substance (e.g., compound) which does not readily evaporate, or only somewhat evaporates, at given conditions of temperature and pressure. A semi-volatile substance (compound), at a given temperature and pressure, is capable of only somewhat being vaporized (vaporizing) or evaporated (evaporating) from a solid or liquid form to a vapor form. For example, at conditions including room temperature and atmospheric pressure, a semi-volatile substance (compound) typically has a relatively lower vapor pressure and a relatively higher boiling point compared to a volatile substance (compound).

The term 'superheating' refers to excessively heating, or to overheating, a substance (e.g., water, steam). For example, regarding water, superheating may refer to excessively heating, or to overheating, water above its boiling point, for a given pressure, without causing vaporization or boiling of the water. For example, regarding steam, superheating may refer to excessively heating, or to overheating, steam to a temperature above its saturation point for a given pressure.

The term 'flash evaporation' refers to flash (or partial) evaporation that occurs when a saturated liquid (e.g., water) stream undergoes a reduction in pressure by passing through a throttling valve or other throttling device (e.g., as part of a flash evaporation device or unit). For example, when a saturated liquid is a multi-component liquid (e.g., contaminated water containing a mixture of different compounds), the flashed vapor is richer in the more volatile components than is the remaining liquid.

The term 'thermal oxidation' refers to oxidizing (oxidation of) a substance (e.g., in solid, liquid, or/and gas form) via thermal (i.e., heat) means involving relatively high temperatures (e.g., 200° C. or higher) compared to room temperature. A particular type or kind of thermal oxidation is regenerative thermal oxidation (RTO), which is based on, and involves, regenerating/recycling heat produced during the thermal oxidation process for further performing or continuing the thermal oxidation process. A regenerative thermal oxidation (RTO) unit generally operates by passing process air including volatile or/and semi-volatile combustible compounds through a hot heat exchanger which transfers heat to the process air. The resulting preheated process air passes through an oxidizer (e.g., thermal oxidizer, flare oxidizer, thermocatalytic oxidizer), generating a hot exhaust. The hot exhaust passes through a cool heat exchanger, heating the cool heat exchanger before being released. In such a way, the heat released by oxidation of a given portion of volatile or/and semi-volatile combustible compounds is recycled to increase oxidation efficiency of a following portion of volatile or/and semi-volatile combustible compounds. If needed, oxygen or/and auxiliary fuel may be added to ensure a clean burning fuel-air mixture. Regenerative thermal oxidation (RTO) processes are of different types or kinds, for example, direct thermal, flare, or thermo-catalytic, RTO processes. Same applicant/assignee exemplary teachings and practices of such regenerative thermal oxidation (RTO) processes, listed in the Background section, are incorporated by reference as if fully set forth herein.

The term 'controlled integration' refers to controlling one or more individual processes or/and process units (for example, chemical engineering unit operations or processes, or/and associated process units thereof) in an integrated manner. Such controlled integration of the one or more processes or/and process units may be in the form of, for example, an integrated, combined, or synergistic cooperative, type of manner or mode of operation.

Specific Exemplary Embodiments

Referring now to the drawings, FIG. 1 is a flow diagram of an exemplary embodiment of the method (generally, indicated as, and referred to by, reference number 100), including the indicated exemplary steps (procedures) thereof, for processing contaminated water containing volatile or/and semi-volatile compounds, via controlled integration of superheating, flash evaporation, and thermal oxidation processes. In FIG. 1, the exemplary embodiment of the method 100 is represented by separate blocks (frames) 104, 108, 112, 116, and 120.

Method 100 is generally referred to as contaminated water processing method 100. As shown in FIG. 1, the exemplary embodiment of contaminated water processing method 100 includes the following.

In 104, there is superheating the contaminated water, for forming superheated contaminated water having a temperature equal to or higher than a predetermined threshold temperature.

In 108, there is flash evaporating the superheated contaminated water, for forming superheated contaminated steam (vapor phase of steam and volatile or/and semi-volatile compounds).

In 112, there is thermally oxidizing the superheated contaminated steam, so as to thermally oxidize the volatile or/and semi-volatile compounds contained therein, and form thermal oxidation gas/vapor products.

In exemplary embodiments of the invention, performance of preceding 104, 108, and 112, results in removal (via conversion to non-hazardous compounds) of the volatile or/and semi-volatile compounds from the contaminated water.

Reference is made to FIG. 2, a flow diagram of another exemplary embodiment of the method for processing contaminated water containing volatile compounds via flash evaporation, particularly highlighting optional controlled integration thereof, and optional, additional inclusion of a heat recycling process.

Accordingly, in exemplary embodiments of the invention, contaminated water processing method 100, optionally, further includes 116, whereby there is controlling integrated operation of, and processing data-information associated with, the superheating 104, flash evaporating 108, and thermally oxidizing 112.

In FIG. 2, such controlling and processing are particularly represented by dashed line 118 extending from 116 and connecting to dashed lines 118a, 118b, and 118c, corresponding to operative interactions between the controlling and processing 116 and the superheating 104, flash evaporating 108, and thermally oxidizing 112, respectively.

In exemplary embodiments of the invention, contaminated water processing method 100 may, optionally, further include 120, whereby there is recycling heat (contained in hot water vapor and gases) from the thermal oxidation gas/vapor products, in the form of steam (vapor), to the superheating 104, thereby providing heat for performing the superheating 104.

Exemplary embodiments of the invention which optionally include recycling heat 120 generated during the thermal oxidation process 112 to the superheating process 104 may, optionally, further include controlling integrated operation of, and processing data-information associated with, the processes of superheating 104, flash evaporating 108, thermally oxidizing 112, as well as the process of recycling heat 120. In FIG. 2, such optional, additional controlling and processing of the process of recycling heat 120 are particularly represented by dashed line 118 extending from 116 and connecting to dashed line 118d, corresponding to additional operative interaction between the controlling and processing 116 and the recycling heat 120.

Another aspect of some embodiments of the present invention is a system for processing contaminated water containing volatile or/and semi-volatile compounds.

FIG. 3 is a (block-type) schematic diagram of an exemplary embodiment of the system (generally, indicated as, and referred to by, reference number 200), including the indicated exemplary units, components, and features thereof, for processing contaminated water containing volatile or/and semi-volatile compounds, via flash evaporation. The exemplary embodiment of the system 200 shown in FIG. 2, is, in a non-limiting manner, suitable for implementing the exemplary embodiments of the method 100 presented in FIGS. 1 and 2, for processing contaminated water containing volatile or/and semi-volatile compounds. Similarly, the exemplary embodiments of the method 100 presented in FIGS. 1 and 2, are, in a non-limiting manner, suitable for implementing the exemplary embodiment of the system 200 shown in FIG. 3, for processing contaminated water containing volatile or/and semi-volatile compounds. Hereinbelow, system 200 is generally referred to as contaminated water processing system 200.

In FIG. 3, contaminated water, for example, contaminated water 204, is held or contained in, and supplied from, a contaminated water input or feed assembly, for example, contaminated water input or feed assembly 208. Contaminated water 204 may include any number and type or kind of volatile compounds, such as volatile organic compounds (VOCs) or/and semi-volatile organic compounds (SVOCs). Contaminated water 204, alternatively, or additionally, may include any number and type or kind of volatile or/and semi-volatile inorganic compounds.

As shown in FIG. 3, the exemplary embodiment of the contaminated water processing system 200 includes the following exemplary process units and functionalities thereof.

A superheating unit 212, configured to superheat the contaminated water 204, for forming superheated contaminated water 216 having a temperature equal to or higher than a predetermined threshold temperature. In exemplary embodiments, superheating unit 212 is operatively connected to a contaminated water input or feed assembly, for example, contaminated water input or feed assembly 208 which holds or contains, and inputs or feeds (supplies) contaminated water 208 to the superheating unit 212.

A flash evaporation unit 220, operatively connected to the superheating unit 212 that flash evaporates the superheated contaminated water 216, for forming superheated contaminated steam 224.

A thermal oxidation unit 228, operatively connected to the flash evaporation unit 220 that thermally oxidizes the superheated contaminated steam 224, so as to thermally oxidize the volatile or/and semi-volatile compounds contained therein, and form thermal oxidation gas/vapor products 232.

In exemplary embodiments of the invention, processing the contaminated water 204 via the superheating unit 212, the flash evaporation unit 220, and the thermal oxidation unit 228, results in removal (via conversion to non-hazardous gas and vapor phase compounds) of the volatile or/and semi-volatile compounds from the contaminated water 204.

As illustratively described hereinabove, and shown in FIG. 2, in exemplary embodiments of the invention, contaminated water processing method 100, optionally, further includes 116, whereby there is controlling integrated operation of, and processing data-information associated with, the superheating 104, flash evaporating 108, and thermally oxidizing 112.

Accordingly, as shown in FIG. 3, in exemplary embodiments of the invention, contaminated water processing system 200 further includes a process control/data-information processing unit 236, operatively connected to, and, controlling integrated operation of and processing data-information associated with, the superheating unit 212, the flash evaporation unit 220, and the thermal oxidation unit 228.

In exemplary embodiments of the invention, contaminated water processing system 200 may, optionally, further include a heat recycling unit 240, operatively connected to the thermal oxidation unit 228 and the superheating unit 212, that recycles heat from the thermal oxidation gas/vapor products 232, in the form of steam (vapor) 242, to the superheating unit 212, thereby providing heat for operating the superheating unit 212 and superheating of the contaminated water 204. In such exemplary embodiments, the process control/data-information processing unit 236, in addition to above described operative connections and configuration, is also operatively connected to, and, controlling integrated operation of and processing data-information associated with, heat recycling unit 240.

In a complimentary manner, in exemplary embodiments, each of the process units, namely, superheating unit 212, flash evaporation unit 220, thermal oxidation unit 228, and, optional, heat recycling unit 240, is operatively connected to, and controlled by, process control/data-information processing unit 236. Operative connections and configurations between the process control/data-information processing unit 236 and each of the other system process units, namely, superheating unit 212, flash evaporation unit 220, thermal oxidation unit 228, and, optional, heat recycling unit 240, are generally represented by the double headed dashed line arrows 244 surrounding process control/data-information processing unit 236.

As shown in FIG. 3, the exemplary embodiment of the contaminated water processing system 200 further includes the following exemplary components (assemblies, devices) and functionalities thereof.

A contaminated water input or feed assembly, for example, contaminated water input or feed assembly 208, for holding or containing, and inputting or feeding (supplying), the contaminated water 204 to the superheating unit 212.

A fan, for example, fan 248, operatively connected between the (flash evaporation output, for example, upper portion, of the) flash evaporation unit 220 and the (input of the) thermal oxidation unit 228. The fan 248 directs and transfers (via forced convection) the superheated contaminated steam (vapor phase of steam and volatile or/and semi-volatile compounds) 224 from the flash evaporation unit 220 to the thermal oxidation unit 228.

A first pump, for example, first pump 252, operatively connected between (non-evaporated liquid output, for example, bottom portion, of) the flash evaporation unit 220 and the (contaminated water input of the) superheating unit 212. The first pump 252 re-cycles/re-circulates, by directing and transferring, via pumping, a portion, for example, a first portion, of non-evaporated superheated contaminated water 217 from the flash evaporation unit 220 back into the superheating unit 212.

A second pump, for example, second pump 256, and a contaminated water residue collection reservoir, for example, contaminated water residue collection reservoir (such as a vessel or container) 260.

The second pump 256 is operatively connected between (non-evaporation output, for example, bottom portion, of) the flash evaporation unit 220 and (input of) the contaminated water residue collection reservoir (vessel or container) 260. The second pump 256 directs and transfers, via pumping, a portion, for example, a second portion, of non-evaporated superheated contaminated water 217 from the flash evaporation unit 220 into the contaminated water residue collection reservoir (vessel or container) 260 which collects, and holds or contains that portion of non-evaporated superheated contaminated water 217 in the form of a contaminated water concentrated residue, for example, contaminated water concentrated residue 264.

In exemplary embodiments of contaminated water processing system 200, process control/data-information processing unit 236, in addition to above described operative connections and configuration, is also operatively connected to, and, controls integrated operation of and processing data-information associated with, the contaminated water input or feed assembly 208, the fan 248, the first and second pumps 252 and 256, respectively, and the contaminated water residue collection reservoir (vessel or container) 260. In a complimentary manner, in exemplary embodiments, each of the contaminated water input or feed assembly 208, the fan 248, the first and second pumps 252 and 256, respectively, and the contaminated water residue collection reservoir (vessel or container) 260, is operatively connected to, and controlled by, process control/data-information processing unit 236. Operative connections and configurations between the process control/data-information processing unit 236 and each of the additional system components, namely, the contaminated water input or feed assembly 208, the fan 248, the first and second pumps 252 and 256, respectively, and the contaminated water concentrate collection reservoir 260, are generally represented by the double headed dashed line arrows 244 surrounding process control/data-information processing unit 236.

As shown in FIG. 3, the exemplary embodiment of the contaminated water processing system 200 further includes the following exemplary operative connections between the various (liquid, vapor, gas, or gas/vapor) fluid handling, process units, and components.

Operative connections between the (liquid, vapor, gas, or gas/vapor) fluid handling, process units, and components, namely, superheating unit 212, flash evaporation unit 220, thermal oxidation unit 228, and heat recycling unit 240, and, the contaminated water input or feed assembly 208, the fan 248, the first and second pumps 252 and 256, respectively, and the contaminated water concentrate collection reservoir 260, are in the form of (liquid, vapor, gas, or gas/vapor) fluid communication lines. Each fluid communication line is of a type according to the particular phase or phases (i.e., liquid, vapor, gas, or gas/vapor) of fluid being transferred, transported, and processed at a given point or location in contaminated water processing system 200.

For example, operative connection between the contaminated water input or feed assembly 208 and the superheating unit 212 is in the form of a (liquid [i.e., contaminated water 204]) fluid communication line 268. For example, operative connection between the superheating unit 212 and the flash evaporation unit 220 is in the form of a (superheated liquid [i.e., superheated contaminated water 216]) fluid communication line 272. For example, operative connection between the flash evaporation unit 220 and the thermal oxidation unit 228 is in the form of (superheated vapor [i.e., superheated contaminated steam 224]) fluid communication lines 276 and 280.

Optional, exemplary embodiments of the invention which include the heat recycling unit 240, operatively connected to the thermal oxidation unit 228 and the superheating unit 212, and configured to recycle heat from the thermal oxidation gas/vapor products 232 to the superheating unit 212, further include the following optional exemplary operative connections.

Operative connection between the thermal oxidation unit 228 and the heat recycling unit 240 being in the form of a (gas/vapor [i.e., thermal oxidation gas/vapor products 232]) fluid communication line 284. Operative connection between the superheating unit 212 and the heat recycling unit 240 being in the form of a (liquid [i.e., condensed steam, water 292]) fluid communication line 288. Operative connection between the heat recycling unit 240 and the superheating unit 212 being in the form of a (superheated vapor [i.e., superheated steam]) fluid communication line 296.

Contaminated water processing system 200 further includes exemplary operative connections between (non-evaporated liquid output, for example, bottom portion, of) the flash evaporation unit 220 and the first pump 252, and between the first pump 252 and the superheating unit 212, in the form of (liquid [i.e., non-evaporated superheated contaminated water 217]) fluid communication lines 300 and 304, respectively. Additionally, for example, operative connection between (non-evaporated liquid output, for example, bottom portion, of) the flash evaporation unit 220 and the second pump 256, and between the second pump 256 and the contaminated water concentrate collection reservoir 260, are in the form of (liquid [i.e., non-evaporated superheated contaminated water 217]) fluid communication lines 308 and 312, respectively.

Additional Exemplary Structural, Functional, and Operational Features of System Process Units, and Components Thereof Following are described additional exemplary structural, functional, and operational features of some embodiments of the contaminated water processing system 200. Such additional features relate to the various system process units, namely, superheating unit 212, flash evaporation unit 220, thermal oxidation unit 228, and heat recycling unit 240, and components thereof, as well as to the contaminated water input or feed assembly 208, the fan 248, the first and second pumps 252 and 256, respectively, and the contaminated water residue collection reservoir (vessel or container) 260, and to the numerous operative connections between the various (liquid, vapor, gas, or gas/vapor) fluid handling, process units, and components.

In exemplary embodiments, any one or more of the process units, components, and assemblies, may include its own separate (local) power supply and (local) process control equipment, whereby, for example, such localized power supply and process control equipment is operatively connected to, and configured to operate in conjunction with, process control/data-information processing unit 236. Alternatively, any one or more of the process units, components, and assemblies, may be directly operatively connected to a centralized (global) power supply, for example, which is operatively connected to, or associated with, centralized (global) process control/data-information processing unit 236.

In exemplary embodiments, such power supply is a multi-functional, multi-operational type of power supply, configured to supply power according to any of various different types of spatial or/and temporal power configurations, modes, formats, schemes, and schedules, involving synchronous, serial (sequential), periodic, non-periodic, or asynchronous, supply of power in the form of dc or/and ac voltage or/and current, to the system process units, components, and assemblies, of contaminated water processing system 200. Such power supply is configured to operate in conjunction with process control/data-information processing unit 236.

In exemplary embodiments, the contaminated water processing system 200 includes appropriate fluid (mass) transfer equipment, such as pipes, tubes, connecting elements, adaptors, fittings, pumps, valves, vents, fans, switches, and, fluid (mass) flow controlling, metering, sensing, and measuring devices, such as fluid (mass) flow controllers, meters, and sensors, as well as associated mechanisms, assemblies, components, and elements thereof, which are made of suitable materials, for fully enabling system process units, components, and assemblies, to perform the herein illustratively described functions and operations.

In exemplary embodiments, the contaminated water processing system 200 includes appropriate heating and heat transfer equipment, such as heaters, heating jackets, heating elements, insulation, pipes, tubes, connecting elements, adaptors, fittings, valves, vents, fans, switches, and, heat (temperature) controlling, sensing, and measuring devices, such as temperature controllers, sensors, and thermocouples, as well as associated mechanisms, assemblies, components, and elements thereof, which are made of suitable materials, for fully enabling system process units, components, and assemblies, to perform the herein illustratively described functions and operations.

In exemplary embodiments, the contaminated water processing system 200 includes automatic electrical or/and electronic operating, controlling, and monitoring (measuring) of the numerous operating parameters and conditions of system process units, components, assemblies, and operative connections.

In exemplary embodiments, electrical or/and electronic input/output, feedforward and feedback transmission and reception of electrical or/and electronic control data, information, and command, communication signals between system process units, components, and assemblies, and, power supply and process control equipment, are provided by (wired or/and wireless) electrical or/and electronic input/output control data, information, and command, communications lines, which may include, for example, cables, bundles, or buses of wires.

In exemplary embodiments of contaminated water processing system 200, operative connections and configurations between the process control/data-information processing unit 236, and each of the other system process units, namely, superheating unit 212, flash evaporation unit 220, thermal oxidation unit 228, and heat recycling unit 240, and, each of the contaminated water input or feed assembly 208, the fan 248, the first and second pumps 252 and 256, respectively, and the contaminated water concentrate collection reservoir 260, are in the form of a (wired or/and wireless) electrical or/and electronic network of input/output data-information control signal communications lines, for example, in FIG. 3, represented by double headed dashed line arrows 244.

In exemplary embodiments, the contaminated water processing system 200 includes appropriate mechanical, hydraulic, electrical, electronic, electro-mechanical, or/and (wired or/and wireless) communications, equipment, as well as mechanisms, assemblies, components, and elements thereof, which are made of suitable materials, for fully enabling automatic electrical or/and electronic controlling and monitoring (measuring) of the numerous operating parameters and conditions, by process control/data-information processing unit 236.

In exemplary embodiments of contaminated water processing system 200, process units, components, assemblies, and operative connections are of configurations and constructions which are compatible with, and operated in accordance with, the physicochemical properties, parameters, and characteristics, of the particular type(s) or kind(s) (for example, with respect to volatile or/and semi-volatile, organic or/and inorganic compounds) and form(s) or phase(s) (for example, with respect to liquid, vapor, gas, or gas/vapor) of fluid being handled, transferred, transported, and processed at a given point or location in contaminated water processing system 200.

Exemplary Implementations/Practices of Some Embodiments of the Invention

With reference made to FIGS. 1-3, of the exemplary embodiments of the method and system for processing contaminated water containing volatile or/and semi-volatile compounds, via flash evaporation, following is illustrative description of exemplary implementations/practices of some embodiments of the invention.

Contaminated water 204, for example, industrial wastewater, is held or contained in, and supplied from, contaminated water input or feed assembly 208. Contaminated water 204 may include any number and type or kind of volatile compounds, such as volatile organic compounds (VOCs) or/and semi-volatile organic compounds (SVOCs). Contaminated water 204, alternatively, or additionally, may include any number and type or kind of volatile or/and semi-volatile inorganic compounds.

Contaminated water 204 is input or fed from contaminated water input or feed assembly 208, via fluid communication line 268, to superheating unit 212. Inside superheating unit 212, contaminated water 204 is superheated, for forming superheated contaminated water 216 having a temperature equal to or higher than a predetermined threshold temperature. Superheating contaminated water 204 is controlled via process control/data-information processing unit 236. This involves controlling the temperature (and range thereof) at which contaminated water 204 is superheated, so as to assure forming superheated contaminated water 216 having an output temperature equal to or higher than the predetermined threshold temperature, and to assure superheated contaminated water 216 remains at such temperature (or within a predetermined temperature range) upon entering the next process of flash evaporation.

In exemplary embodiments, the predetermined threshold temperature is a temperature higher than the boiling point (100° C.) of water at atmospheric pressure, for example, 103° C., or 104° C., or 105° C., or higher, such as 110° C. In exemplary embodiments, the predetermined threshold temperature is a temperature in a range of between about 103° C. and about 120° C. In exemplary embodiments, superheating contaminated water 204 is performed for forming superheated contaminated water 216 having a temperature equal to or higher than the predetermined threshold temperature, whereby during the superheating process, the temperature is controllably allowed to vary within a predetermined temperature range. In exemplary embodiments, the predetermined temperature range is a relatively narrow temperature range, for example, of less than about ten degrees, and may even be as narrow as about two degrees. Exemplary predetermined temperature ranges are: between 103° C. and 112° C., between 103° C. and 110° C., between 103° C. and 108° C., between 103° C. and 106° C., between 103° C. and 105° C., between 105° C. and 110° C., between 107° C. and 110° C., and between 108° C. and 110° C.

Inside superheating unit 212, part of contaminated water 204 condenses as condensed steam 292, which, in optional exemplary embodiments, is fed (recycled), via fluid communication line 288, to heat recycling unit 240.

Superheated contaminated water 216 exits superheating unit 212, and via fluid communication line 272, enters flash evaporation unit 220. Inside flash evaporation unit 220, superheated contaminated water 216 is flash evaporated, for forming superheated contaminated steam (vapor phase of steam and volatile or/and semi-volatile compounds) 224.

In exemplary embodiments, superheated contaminated steam 224 maintains an output temperature equal to or higher than the predetermined threshold temperature.

Inside flash evaporation unit 220, superheated contaminated water 216 which is not evaporated remains in the form of non-evaporated superheated contaminated water 217. A first portion of non-evaporated superheated contaminated water 217 is fed (recycled/recirculated) from flash evaporation unit 220, via fluid communication lines 300 and 304, and first pump 252, back into superheating unit 212, for mixing with initially fed contaminated water 204, and superheating thereof. A second portion of non-evaporated superheated contaminated water 217 is directed and transferred from flash evaporation unit 220, via fluid communication lines 308 and 312, and second pump 256, into contaminated water residue collection reservoir (vessel or container) 260 which collects, and holds or contains that portion of non-evaporated superheated contaminated water 217 in the form of contaminated water concentrated residue 264.

Superheated contaminated steam 224 exits flash evaporation unit 220, and via fluid communication lines 276 and 280, and (forced convection) fan 248, enters thermal oxidation unit 228. Inside thermal oxidation unit 228, superheated contaminated steam (vapor phase of steam and volatile or/and semi-volatile compounds) 224 is thermally oxidized, so as to thermally oxidize volatile or/and semi-volatile compounds contained therein, and form thermal oxidation gas and vapor (gas/vapor) products 232.

Exemplary types of thermal oxidation which are applicable for implementing some embodiments of the invention are direct thermal oxidation, thermal flare oxidation, thermo-catalytic oxidation, recuperative thermal oxidation, and regenerative types of thermal oxidation (RTO) processes (e.g., direct thermal, flare, or thermo-catalytic, RTO processes).

Accordingly, thermal oxidation unit 228 is configured to be operable according to any of these exemplary specific types of thermal oxidation.

Performance of the preceding processes, and processing contaminated water 204 via superheating unit 212, flash evaporation unit 220, and thermal oxidation unit 228, for forming thermal oxidation gas and vapor (gas/vapor) products 232, results in removal (via conversion to non-hazardous gas and vapor phase compounds, e.g., carbon dioxide) of the volatile or/and semi-volatile compounds from contaminated water 204.

As illustratively described hereinabove, and shown in FIG. 2, in exemplary embodiments of the invention, contaminated water processing method 100, optionally, further includes 116, whereby there is controlling integrated operation of, and processing data-information associated with, the superheating 104, flash evaporating 108, and thermally oxidizing 112.

Accordingly, exemplary implementation and practice of some exemplary embodiments of the invention, optionally, further include controlling integrated operation of, and processing data-information (e.g., operating parameters and conditions) associated with, superheating unit 212, flash evaporation unit 220, and thermal oxidation unit 228, by process control/data-information processing unit 236. In FIG. 2, such controlling and processing are particularly represented by dashed line 118 extending from 116 and connecting to dashed lines 118a, 118b, and 118c, corresponding to operative interactions between the controlling and processing 116 and the superheating 104, flash evaporating 108, and thermally oxidizing 112, respectively. In FIG. 3, such controlling and processing are particularly represented by double headed dashed line arrows 244 interfacing between process control/data-information processing unit 236 and the other process units.

Exemplary embodiments of the invention may, optionally, further include recycling heat (contained in hot water vapor and gases) from thermal oxidation gas/vapor products 232 to the superheating process, thereby providing heat for superheating contaminated water 204.

According to such exemplary embodiments, condensed steam 292 is fed (recycled) from superheating unit 212, via fluid communication line 288, into heat recycling unit 240.

Inside heat recycling unit 240, heat from thermal oxidation gas/vapor products 232 is used for heating (vaporizing) condensed steam 292, for forming steam (vapor) 242. Steam (vapor) 242 exits heat recycling unit 240, and via fluid communication line 296, enters superheating unit 212, and is used for providing heat for operating superheating unit 212, and superheating of contaminated water 204.

Such optional exemplary embodiments of the invention which include recycling heat generated during the thermal oxidation process to the superheating process further include controlling integrated operation of, and processing data-information (e.g., operating parameters and conditions) associated with, heat recycling unit 240, by process control/data-information processing unit 236.

Implementation of some embodiments of the invention results in obtaining high yields and high energy efficiencies for removal of the volatile compounds from the contaminated water. By implementing and practicing some embodiments of the herein disclosed invention, in laboratory scale, pilot scale, and plant full scale, environments, the inventor obtained significantly improved results of removing volatile compounds from contaminated water compared to results obtained using existing techniques for processing contaminated water containing volatile compounds. Such improved results include better yields, energy efficiencies, and cost effectiveness of removing volatile compounds, such as volatile organic compounds (VOCs) or/and semi-volatile organic compounds (SVOCs), as well as volatile or/and semi-volatile inorganic compounds, from contaminated water (e.g., industrial wastewater). Improved results were obtained without requiring a steam or/and air stripping process, and without requiring further processing (for example, via biological polishing) of initially processed contaminated water.

Exemplary results include yields of higher than 99% removal of volatile organic compounds (VOCs), and higher than 90% removal of semi-volatile organic compounds (SVOCs), from contaminated water.

Each of the following terms written in singular grammatical form: 'a', 'an', and 'the', as used herein, means 'at least one', or 'one or more'. Use of the phrase 'one or more' herein does not alter this intended meaning of 'a', 'an', or 'the'. Accordingly, the terms 'a', 'an', and 'the', as used herein, may also refer to, and encompass, a plurality of the stated entity or object, unless otherwise specifically defined or stated herein, or, unless the context clearly dictates otherwise. For example, the phrases: 'a unit', 'a device', 'an assembly', 'a mechanism', 'a component', 'an element', and 'a step or procedure', as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: 'includes', 'including', 'has', 'having', 'comprises', and 'comprising', and, their linguistic/grammatical variants, derivatives, or/and conjugates, as used herein, means 'including, but not limited to', and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof. Each of these terms is considered equivalent in meaning to the phrase 'consisting essentially of'.

Each of the phrases 'consisting of' and 'consists of', as used herein, means 'including and limited to'.

The phrase 'consisting essentially of', as used herein, means that the stated entity or item (system, system unit, system sub-unit, device, assembly, sub-assembly, mechanism, structure, component, element, or, peripheral equipment, utility, accessory, or material, method or process, step or procedure, sub-step or sub-procedure), which is an entirety or part of an exemplary embodiment of the disclosed invention, or/and which is used for implementing an exemplary embodiment of the disclosed invention, may include at least one additional 'feature or characteristic' being a system unit, system sub-unit, device, assembly, sub-assembly, mechanism, structure, component, or element, or, peripheral equipment, utility, accessory, or material, step or procedure, sub-step or sub-procedure), but only if each such additional 'feature or characteristic' does not materially alter the basic novel and inventive characteristics or special technical features, of the claimed entity or item.

The term 'method', as used herein, refers to steps, procedures, manners, means, or/and techniques, for accomplishing a given task including, but not limited to, those steps, procedures, manners, means, or/and techniques, either known to, or readily developed from known steps, procedures, manners, means, or/and techniques, by practitioners in the relevant field(s) of the disclosed invention.

Throughout this disclosure, a numerical value of a parameter, feature, characteristic, object, or dimension, may be stated or described in terms of a numerical range format. Such a numerical range format, as used herein, illustrates implementation of some exemplary embodiments of the invention, and does not inflexibly limit the scope of the exemplary embodiments of the invention. Accordingly, a stated or described numerical range also refers to, and encompasses, all possible sub-ranges and individual numerical values (where a numerical value may be expressed as a whole, integral, or fractional number) within that stated or described numerical range. For example, a stated or described numerical range 'from 1 to 6' also refers to, and encompasses, all possible sub-ranges, such as 'from 1 to 3', 'from 1 to 4', 'from 1 to 5', 'from 2 to 4', 'from 2 to 6', 'from 3 to 6', etc., and individual numerical values, such as '1', '1.3', '2', '2.8', '3', '3.5', '4', '4.6', '5', '5.2', and '6', within the stated or described numerical range of 'from 1 to 6'. This applies regardless of the numerical breadth, extent, or size, of the stated or described numerical range.

Moreover, for stating or describing a numerical range, the phrase 'in a range of between about a first numerical value and about a second numerical value', is considered equivalent to, and meaning the same as, the phrase 'in a range of from about a first numerical value to about a second numerical value', and, thus, the two equivalently meaning phrases may be used interchangeably. For example, for stating or describing the numerical range of room temperature, the phrase 'room temperature refers to a temperature in a range of between about 20° C. and about 25° C.', and is considered equivalent to, and meaning the same as, the phrase 'room temperature refers to a temperature in a range of from about 20° C. to about 25° C.'.

The term 'about', as used herein, refers to ±10% of the stated numerical value.

The phrase 'operatively connected', as used herein, equivalently refers to the corresponding synonymous phrases 'operatively joined', and 'operatively attached', where the operative connection, operative joint, or operative attachment, is according to a physical, or/and electrical, or/and electronic, or/and mechanical, or/and electro-mechanical, manner or nature, involving various types and kinds of hardware or/and software equipment and components.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment.

Conversely, various aspects, characteristics, and features, of the invention which are illustratively described and presented in combination or sub-combination in the context or format of a single embodiment, may also be illustratively described and presented in the context or format of a plurality of separate embodiments.

Although the invention has been illustratively described and presented by way of specific exemplary embodiments, and examples thereof, it is evident that many alternatives, modifications, or/and variations, thereof, will be apparent to those skilled in the art.

Accordingly, it is intended that all such alternatives, modifications, or/and variations, fall within the spirit of, and are encompassed by, the broad scope of the appended claims.

All publications, patents, and or/and patent applications, cited or referred to in this disclosure are herein incorporated in their entirety by reference into the specification, to the same extent as if each individual publication, patent, or/and patent application, was specifically and individually indicated to be incorporated herein by reference. In addition, citation or identification of any reference in this specification shall not be construed or understood as an admission that such reference represents or corresponds to prior art of the present invention. To the extent that section headings are used, they should not be construed as necessarily limiting.

What is claimed is:

1. A method for processing contaminated water containing volatile or/and semi-volatile compounds, the method comprising:

superheating the contaminated water, for forming superheated contaminated water having a temperature higher than a predetermined threshold temperature of about 103° C.;

flash evaporating said superheated contaminated water at said temperature, for forming superheated contaminated steam; and thermally oxidizing said superheated contaminated steam, so as to thermally oxidize the volatile or/and semi-volatile compounds contained therein, and form thermal oxidation gas/vapor products;

characterized in that said superheated contaminated water is heated to a temperature in a range of between about 103° C. and about 120° C.

2. The method of claim 1, wherein said predetermined threshold temperature is a temperature selected from the group consisting of 104° C., 105° C., and 110° C.

3. The method of claim 1, wherein said temperature of said superheated contaminated water is maintained within a predetermined temperature range of ten degrees.

4. The method of claim 3, wherein said superheating is performed so that said superheated contaminated water remains at said predetermined threshold temperature when initiating said flash evaporating process.

5. The method of claim 3, wherein said predetermined temperature range is at most two degrees.

6. The method of claim 1, further comprising recycling heat from said thermal oxidation gas/vapor products to said superheating, thereby providing heat for performing said superheating.

7. The method of claim 1, wherein said superheating is spatially and temporally directly, and sequentially immediately, operatively connected to, and followed by, said flash evaporating.

8. The method of claim 1, wherein said flash evaporating is spatially and temporally directly, and sequentially immediately, operatively connected to, and followed by, said thermally oxidizing.

9. The method of claim 8, further comprising recycling heat from said thermal oxidation gas/vapor products to said superheating, wherein said recycling heat is spatially and temporally directly, and sequentially immediately, operatively connected to, and followed by, said superheating.

* * * * *